(12) United States Patent
Marjoram et al.

(10) Patent No.: US 8,322,497 B2
(45) Date of Patent: Dec. 4, 2012

(54) MAGNETO-RHEOLOGICAL DAMPERS FOR SEMI-ACTIVE SUSPENSION SYSTEMS

(75) Inventors: Robert H. Marjoram, Holly Springs, NC (US); Stephen F. Hildebrand, Apex, NC (US); Douglas E. Ivers, Cary, NC (US); Gregory Ericksen, Cary, NC (US); William J. McMahon, Chapel Hill, NC (US); Kenneth A. St. Clair, Cary, NC (US)

(73) Assignee: Lord Corporation, Cary, NC (US)

(*) Notice: Subject to any disclaimer, the term of this patent is extended or adjusted under 35 U.S.C. 154(b) by 342 days.

(21) Appl. No.: 12/610,648

(22) Filed: Nov. 2, 2009

(65) Prior Publication Data
US 2010/0096818 A1  Apr. 22, 2010

Related U.S. Application Data

(63) Continuation-in-part of application No. 11/742,911, filed on May 1, 2007, now Pat. No. 7,849,983, and a continuation-in-part of application No. PCT/US2007/083171, filed on Oct. 31, 2007.

(60) Provisional application No. 60/796,567, filed on May 1, 2006.

(51) Int. Cl.
*F16F 15/03* (2006.01)
(52) U.S. Cl. ............... 188/267; 188/267.2; 188/322.17
(58) Field of Classification Search ............... 267/64.11, 267/64.15, 64.21, 64.24; 92/165 R, 168; 188/267, 267.1, 267.2, 322.16, 322.17
See application file for complete search history.

(56) References Cited

U.S. PATENT DOCUMENTS

| 2,850,276 | A |   | 9/1958 | Jackson |
|---|---|---|---|---|
| 4,079,925 | A |   | 3/1978 | Salin |
| 4,428,566 | A | * | 1/1984 | de Baan et al. ............ 267/64.15 |
| 4,790,522 | A |   | 12/1988 | Drutchas |
| 5,277,281 | A |   | 1/1994 | Carlson et al. |

(Continued)

FOREIGN PATENT DOCUMENTS
DE      2642932 A * 3/1978
(Continued)

OTHER PUBLICATIONS

J. David Carlson and B.F. Spencer, Jr., Magnetorheological Fluid Dampers for Seismic Control, Proceedings of DETC 97, ASME Design Engineering Technical Conferences, 1997, 6 pages.

(Continued)

*Primary Examiner* — Pamela Rodriguez
(74) *Attorney, Agent, or Firm* — Richard G. Miller

(57) ABSTRACT

A magneto-rheological fluid damper includes a damper body having a reservoir for a magneto-rheological fluid, a piston rod, a piston rod guide disposed within the damper body, where the piston rod guide has a passage therein for receiving the piston rod. The magneto-rheological fluid damper further includes at least a first piston rod seal and at least a second piston rod seal arranged to seal between the piston rod guide and the piston rod. The magneto-rheological fluid damper further includes a fluid chamber defined between the piston rod guide and the piston rod, the fluid chamber being in communication with the reservoir. The magneto-rheological fluid damper further includes a piston rod guide filter arranged in a communication path between the fluid chamber and the reservoir to filter particulates out of the magneto-rheological fluid entering the fluid chamber. The magneto-rheological fluid damper further includes an accumulator arranged between the piston rod guide and the damper body.

22 Claims, 7 Drawing Sheets

U.S. PATENT DOCUMENTS

| | | | |
|---|---|---|---|
| 5,458,217 A * | 10/1995 | Ohishi | 188/267.1 |
| 5,549,837 A | 8/1996 | Ginder et al. | |
| 5,878,851 A | 3/1999 | Carlson et al. | |
| 6,070,681 A | 6/2000 | Catanzarite et al. | |
| 6,311,810 B1 | 11/2001 | Hopkins et al. | |
| 6,318,526 B1 | 11/2001 | Kruckemeyer et al. | |
| 6,336,535 B1 | 1/2002 | Lisenker | |
| 6,382,369 B1 * | 5/2002 | Lisenker | 188/267.2 |
| 6,419,057 B1 | 7/2002 | Oliver et al. | |
| 6,481,546 B2 | 11/2002 | Oliver et al. | |
| 6,860,371 B2 | 3/2005 | Ananthanarayanan et al. | |
| 6,883,649 B2 * | 4/2005 | Lun | 188/267.2 |
| 6,953,108 B2 | 10/2005 | Anderfaas et al. | |
| 6,953,109 B2 | 10/2005 | Watson et al. | |
| 7,011,193 B2 | 3/2006 | Lemmens et al. | |
| 7,413,063 B1 * | 8/2008 | Davis | 188/267.1 |
| 7,997,393 B2 * | 8/2011 | Hart | 188/267.2 |
| 2002/0130001 A1 | 9/2002 | Lisenker | |
| 2003/0029683 A1 | 2/2003 | Oliver et al. | |
| 2003/0070892 A1 | 4/2003 | Iyengar et al. | |
| 2003/0094341 A1 | 5/2003 | Lemieux | |
| 2004/0104061 A1 | 6/2004 | Oliver et al. | |
| 2004/0154524 A1 | 8/2004 | Fedders | |
| 2004/0182661 A1 | 9/2004 | Lun | |
| 2004/0195062 A1 | 10/2004 | Anderfaas et al. | |
| 2005/0148420 A1 | 7/2005 | Murao | |
| 2006/0260891 A1 | 11/2006 | Kruckemeyer et al. | |

FOREIGN PATENT DOCUMENTS

| | | | |
|---|---|---|---|
| DE | 4244204 | A1 | 6/1994 |
| EP | 0150104 | A2 | 7/1985 |
| EP | 1013963 | A2 * | 6/2000 |
| EP | 1355083 | A2 | 10/2003 |
| EP | 1661796 | A2 | 5/2006 |
| FR | 1094516 | A | 5/1955 |
| FR | 1414941 | A | 9/1965 |
| FR | 1414841 | A | 10/1965 |
| FR | 2579283 | A | 9/1986 |
| JP | 07-004944 | A | 10/1995 |
| JP | 2009127722 | A * | 6/2009 |
| WO | 94/00704 | A | 1/1994 |
| WO | 98/56642 | A | 12/1998 |
| WO | 2008/136851 | A2 | 11/2008 |

OTHER PUBLICATIONS

J.D. Carlson AD B.F. Spencer, Jr., Magneto-Rheological Fluid Dampers for Semi-Active Seismic Control, Third International Conference on Motion and Vibration Control, 1996, 6 pages.

H. Janocha, Adaptronics and Smart Structures, Basics, Materials, Design, and Applications, Springer-Verlag Berlin Heidelberg 1999, pp. 180-238.

B.F. Spencer, Jr., J. David Carlson, M.K. Sain, G. Yang, On the Current Status of Magnetorheological Dampers: Seismic Protection of Full-Scale Structures, Proceedings of the 1997 American Control Conference, Albuquerque, New Mexico, 5 pages.

J. David Carlson and Billie F. Spencer, Jr., Magneto-Rheological Fluid Dampers: Scalability and Design Issues for Application to Dynamic Hazard Mitigation, pp. 99-109.

AHR International, Glacier Bearings, http://www.ahrinternational.com/glacier_bearings.htm, Oct. 30, 2007, 6 pages.

* cited by examiner

MAGNETO-RHEOLOGICAL DAMPERS FOR SEMI-ACTIVE SUSPENSION SYSTEMS

CROSS REFERENCE

This application is a continuation-in-part of application Ser. No. 11/742,911, filed May 1, 2007 now U.S. Pat. No. 7,849,983, which claims the benefit of U.S. Provisional Application No. 60/796,567, filed May 1, 2006, all of which the benefit are claimed and are herein incorporated by reference. This application is a continuation-in-part of International Application No. PCT/US07/83171, filed Oct. 31, 2007, which claims the benefit of application Ser. No. 11/742,911, filed May 1, 2007, which claims the benefit of U.S. Provisional Application No. 60/796,567, filed May 1, 2006, all of which the benefit are claimed and are herein incorporated by reference.

FIELD OF THE INVENTION

The invention relates generally to the field of hydraulic dampers. More particularly, the invention relates to the field of magneto-rheological dampers.

BACKGROUND OF THE INVENTION

Magneto-rheological fluid dampers typically include a damper body with a sliding piston rod received therein. The damper body includes a reservoir that is filled with magneto-rheological fluid, i.e., non-colloidal suspension of micron-sized magnetizable particles. The damping characteristics are controlled by applying a magnetic field to the magneto-rheological fluid. Magneto-rheological fluid dampers used in semi-active suspension systems designed for heavy vehicles or rough road and off-road vehicles typically require high charge pressures, e.g., 1500 psig, to avoid cavitation and air ingestion. It is desirable to avoid air digestion because it causes permanent reduction of damper performance. It is desirable to minimize cavitation because it causes a temporary reduction of damper performance and erosion of the damper materials. However, at such high charge pressures, seals used in containing magneto-rheological fluid within the damper body as the piston rod reciprocates within the damper body are likely to be short-lived.

SUMMARY OF THE INVENTION

A magneto-rheological damper, comprising a damper body having a reservoir for a magneto-rheological fluid; a piston rod; a piston rod guide disposed within the damper body, the piston rod guide having a passage therein for receiving the piston rod; at least a first piston rod seal and at least a second piston rod seal arranged to seal between the piston rod guide and the piston rod; a fluid chamber defined between the piston rod guide and the piston rod, the fluid chamber being in communication with the reservoir; a piston rod guide filter arranged in a communication path between the fluid chamber and the reservoir to filter particulates out of the magneto-rheological fluid entering the fluid chamber; and an accumulator arranged between the piston rod guide and the damper body.

A magneto-rheological damper, comprising a damper body having a reservoir for a magneto-rheological fluid; a piston rod; a piston rod guide disposed within the damper body, the piston rod guide having a passage therein for receiving the piston rod; a piston rod bearing assembly coupled to the piston rod guide and arranged to engage and support reciprocal motion of the piston rod; at least a first piston rod seal and at least a second piston rod seal arranged to seal between the piston rod guide and the piston rod; a fluid chamber defined between the piston rod guide and the piston rod, the fluid chamber being in communication with the reservoir; means for filtering fluid entering the fluid chamber; and an accumulator arranged between the piston rod guide and the damper body.

A method of controlling motion, said method including: providing a magneto-rheological fluid; providing a damper body having a reservoir for containing the magneto-rheological fluid; providing a piston rod; providing a piston rod guide disposed within the damper body, the piston rod guide having a passage therein for receiving the piston rod; providing a piston rod assembly coupled to the piston rod guide and arranged to engage and support reciprocal motion of the piston rod; providing at least a first piston rod seal and at least a piston rod seal arranged to seal between the piston rod guide and the piston rod; providing a fluid chamber defined between the piston rod guide and the piston rod; providing a piston rod guide filter arranged in a communication path between the fluid chamber and the reservoir to filter particulates out of fluid entering the fluid chamber; and providing an accumulator arranged between the piston rod guide and the damper body.

A magneto-rheological damper, comprising a damper body; a piston rod guide disposed within the damper body, the piston rod guide having a passage therein for receiving a piston rod; a piston rod bearing assembly disposed in the piston rod guide to engage with and support reciprocal motion of the piston rod; at least a first piston rod seal and at least a second piston rod seal arranged to seal between the piston rod guide and the piston rod; a lubrication chamber defined between the piston rod guide and the piston rod; a piston rod guide filter, said piston rod guide filter filtering fluid entering the lubrication chamber; and a piston rod guide gas charged accumulator, said piston rod guide gas charged accumulator arranged between the piston rod and the damper body.

A land vehicle suspension system fluid damper, comprising a damper body; a piston rod guide disposed within the damper body, the piston rod guide having a passage therein for receiving a piston rod; a piston rod bearing assembly disposed in the piston rod guide to engage with and support reciprocal motion of the piston rod; at least a first piston rod seal and at least a second piston rod seal arranged to seal between the piston rod guide and the piston rod; a lubrication chamber defined between the piston rod guide and the piston rod; and a piston rod guide gas charged accumulator, said piston rod guide gas charged accumulator arranged between the piston rod and the damper body.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

Figure 1A:
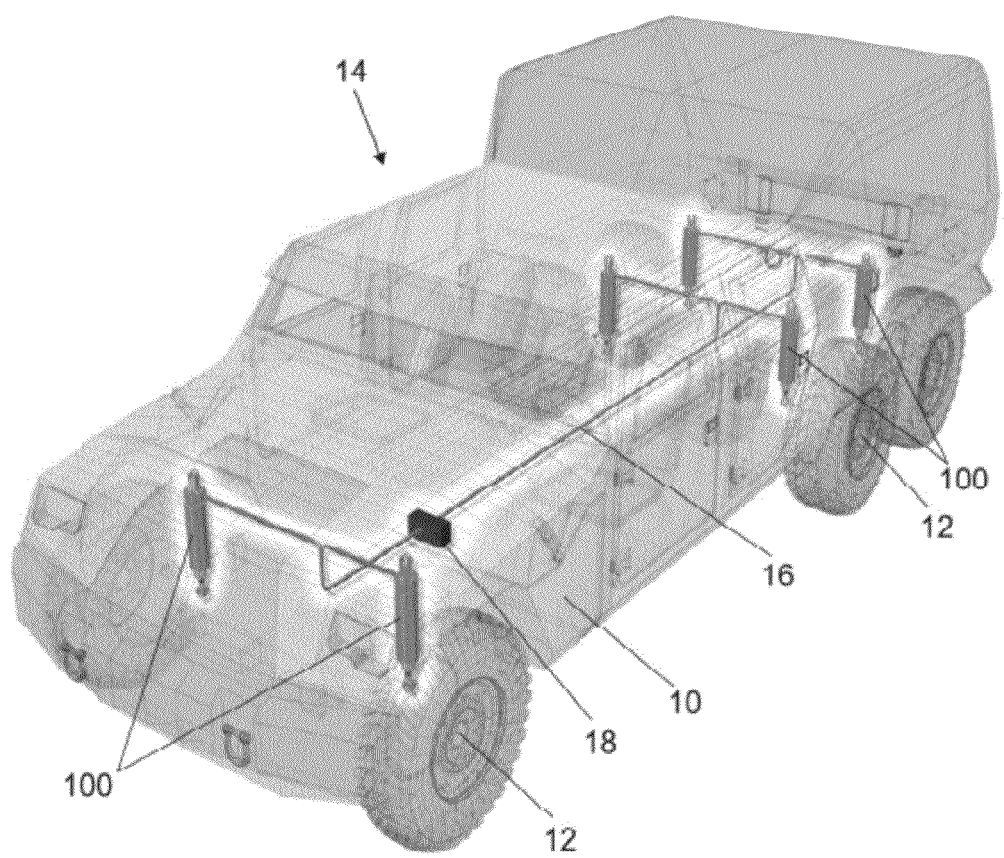
FIG. 1A is a schematic illustration of a vehicle with magneto-rheological fluid damper.

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

Figure 1B:
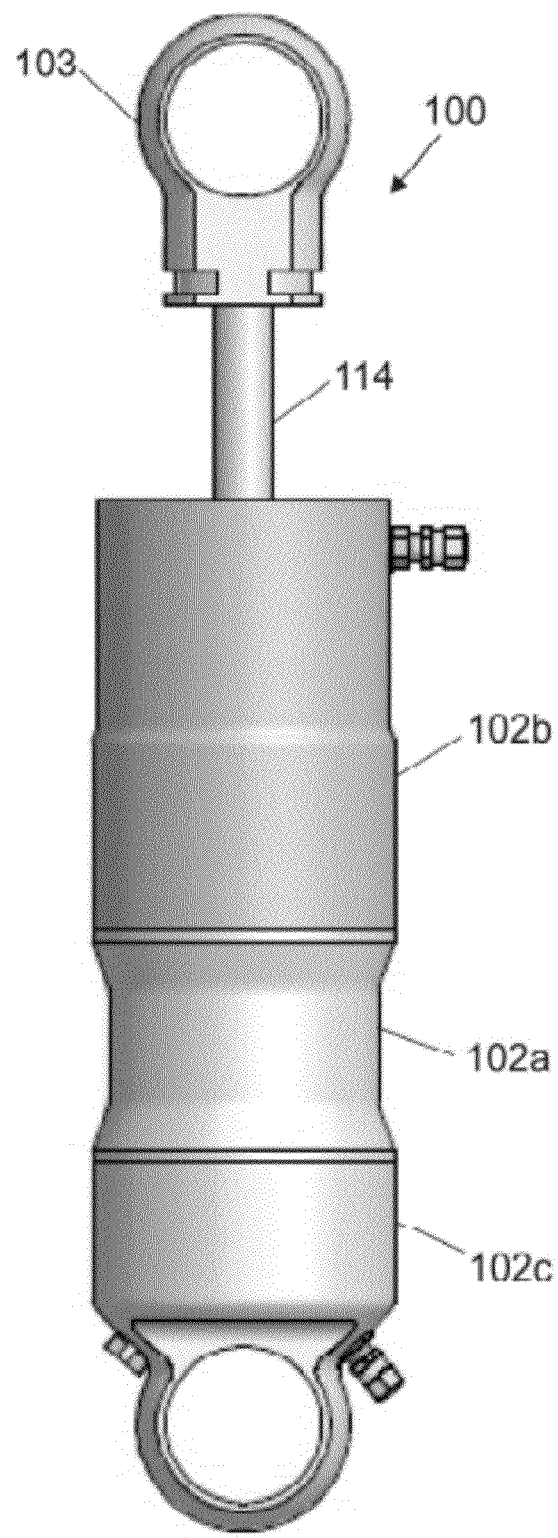
FIG. 1B is a perspective view of a magneto-rheological fluid damper.
Figure 1C:
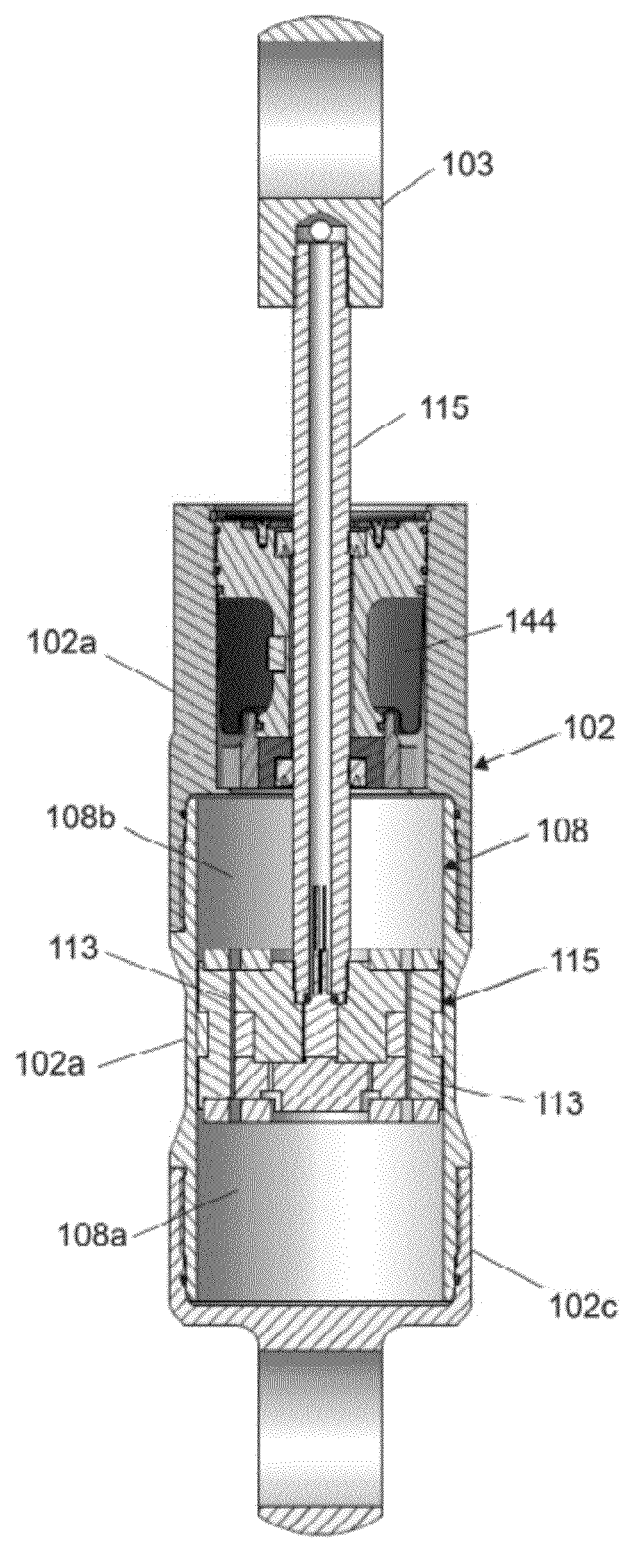
FIG. 1C is a cross-section view of a magneto-rheological fluid damper.
Figure 1D:
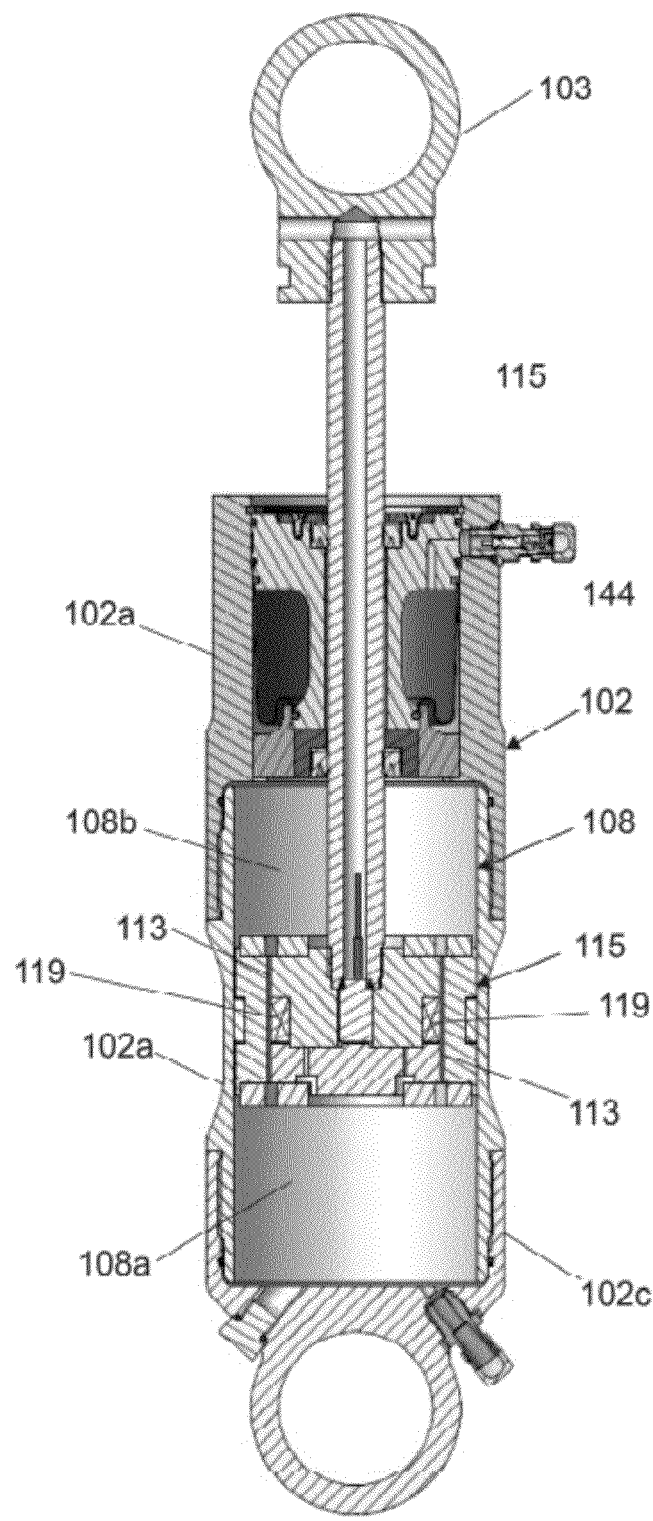
FIG. 1D is a cross-section view of a magneto-rheological fluid damper.

FIG. 1A depicts an exemplary vehicle 14 with magneto-rheological fluid dampers 100 according to the invention connected between the body 10 and the wheels 12 of the vehicle. The magneto-rheological fluid dampers 100 are in communication with a suspension control system 16 including a control unit 18. The vehicle 14 in preferred embodiments is a land vehicle, preferably a wheeled land vehicle which preferably transports variable payloads over varied land conditions, such as a truck or off-road vehicle, as shown in FIG. 1, or may be another type of vehicle. In preferred embodiments the magneto-rheological fluid dampers are primary vehicle suspension magneto-rheological fluid dampers in the primary suspension of the vehicle between the vehicle body 10 and the wheels 12. In alternative embodiments the magneto-rheological fluid dampers are secondary vehicle suspension magneto-rheological fluid dampers in the secondary suspension systems of vehicles, such as for the suspension system for the vehicle cab or the vehicle seat. Alternatively, the magneto-rheological fluid dampers 100 may be used in a semi-active suspension system that is not coupled to a vehicle. FIG. 1B is an enlargement of the magneto-rheological fluid damper 100. The magneto-rheological fluid damper 100 includes a damper body 102. In this example, the damper body 102 is made of several parts, including a cylinder part 102a and end caps 102b, 102c. The end caps 102b, 102c are coupled to distal ends of the cylinder part 102a. The cylinder part 102a is preferably a hydraulic cylinder. It contains a reservoir of magneto-rheological fluid (not shown) and a piston (not shown). The piston is coupled to a piston rod 114, which extends through the end cap 102b. The piston rod 114 extends through the end cap 102b and includes a rod end 103 for coupling to a frame or other devices.

Figure 2A:
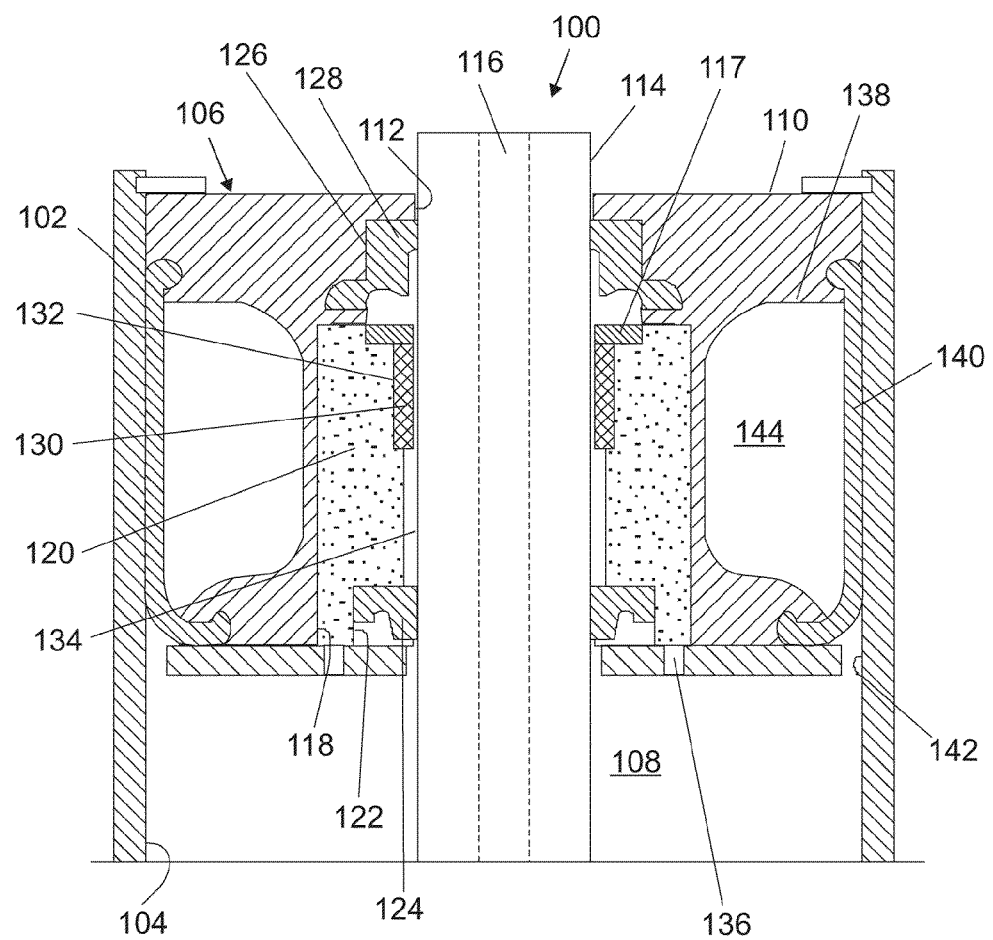
FIGS. 2A, 2B, and 3 depict a partial cross-section of the magneto-rheological fluid damper of FIG. 1B.
Figure 2B:
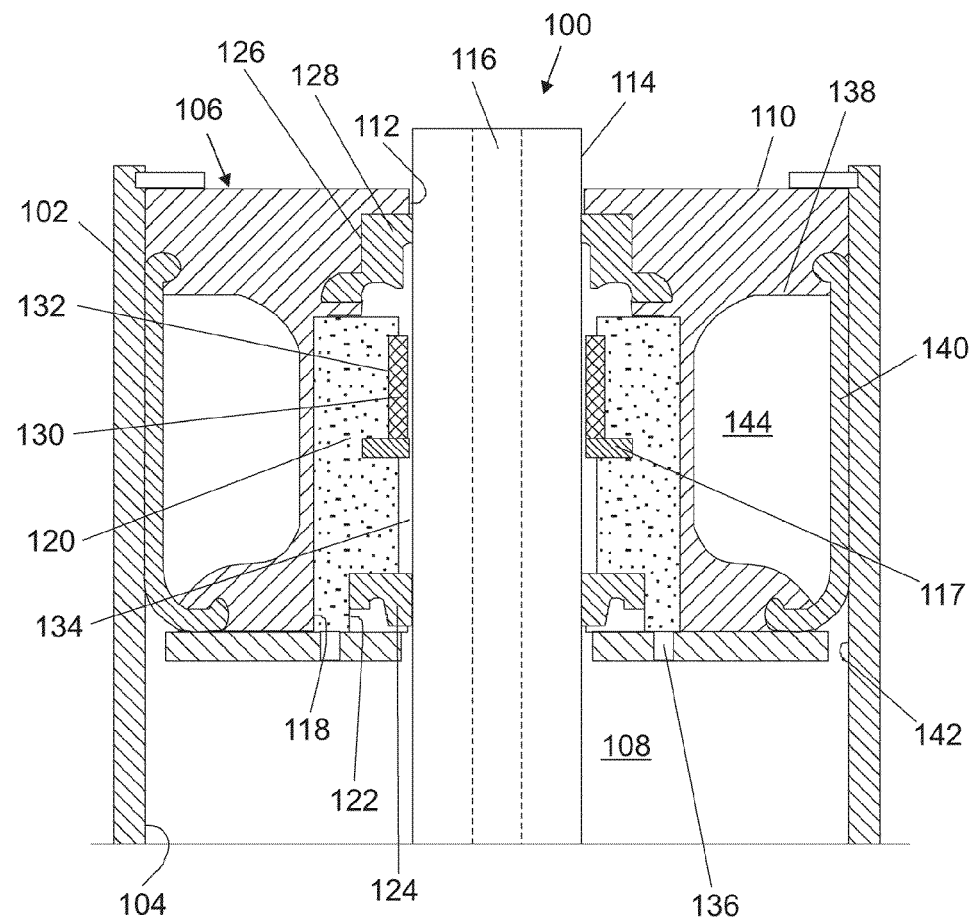

FIGS. 2A and 2B depict a cross-section of the end cap 102b portion of the magneto-rheological fluid damper 100. In FIGS. 2A and 2B, the magneto-rheological fluid damper 100 includes a damper body 102 having a hollow interior 104 in which a piston rod guide 106 is arranged. The damper body 102 may be made of a magnetic metal material, preferably a low magnetic metal material such as carbon steel. The magneto-rheological fluid damper 100 may be a monotube damper having a single reservoir 108, defined below the piston rod guide 106, for containing a magneto-rheological fluid, with the single reservoir 108 being divided by the piston 115 into a first variable volume magneto-rheological fluid damper chamber 108a and a second variable volume magneto-rheological fluid damper chamber 108b with at least one EM coil controllable magneto-rheological fluid flow conduit 113 between the first and second chambers for controlling the fluid flow (controllable current supplied to EM coil 119 produces controllable magnetic field strength for a controllable yield strength of the magneto-rheological fluid). The magneto-rheological fluid contains micron-sized magnetizable particles in a carrier fluid. Such magneto-rheological fluid is available from, for example, Lord Corporation, Cary, N.C. In one example, the magneto-rheological fluid contains iron particles and is such that the rheology of the fluid changes from a free flowing liquid to a flow resistant semi-solid with controllable yield strength when exposed to a magnetic field. In one example, the magneto-rheological fluid contains magnetizable particles having a mean particle size of about 1 micron.

The piston rod guide 106 has an annular body 110 with a passage 112 for receiving a piston rod 114. In an embodiment the piston rod 114 is made of a nonmagnetic material, such as stainless steel. A position sensor 116 is housed within the piston rod 114. In one example, the position sensor 116 is a magnetostrictive sensor which senses stroke position of the piston along the stroke length of the damper. The position sensor 116 may communicate with an external control system or may include an internal control system. A magnetic field generator 117 may be provided proximate the piston rod 114 to create a magnetic field around the position sensor 116. The magnetic field generator 117 in one example may be a permanent magnet, which may be in the form of a ring circumscribing the piston rod 114 or position sensor 116. Alternatively, the magnetic field generator 117 may be an electromagnetic coil that is supplied with current to generate a magnetic field for the position sensor 116.

The annular body 110 includes an inner annular recess 118 circumscribing the passage 112 for receiving the piston rod 114. A filtering media 120, which may be annular in shape, is disposed within the annular recess 118. The magnetic field generator 117 described above may be included in the filtering media 120, for example, arranged in a pocket or otherwise supported on or in the filtering media 120. In one example, the filtering media 120 is made of a porous non-magnetic, corrosion-resistant material. In one example, the porous filtering media 120 has pore size less than or equal to 250 nm. In one example, the porous filtering media 120 is made of porous stainless steel having pore size less than or equal to 250 nm. The filtering media 120 includes a pocket 122 inside of which is disposed an inner piston rod seal 124. The annular body 110 includes a pocket 126 inside of which is disposed an outer piston rod seal 128. The inner and outer piston rod seals 124, 128 are arranged to engage the wall of the piston rod 114, thereby forming inner and outer seals between the piston rod guide 106 (or annular body 110) and the piston rod 114. The seals 124, 128 may be made of suitable sealing materials such as elastomeric materials.

The filtering media 120 may include a pocket 130 for receiving a piston rod bearing assembly 132. When the piston rod 114 is received in the passage 112, the piston rod bearing 132 is arranged between the piston rod 114 and the filtering media 120. Further, the piston rod bearing 132 engages with and supports reciprocal motion of the piston rod 114. Any suitable piston rod bearing 132 capable of supporting reciprocal motion of the piston rod 114 may be used. For example, Glacier Garlock DU or DP-4 bearings, available from AHR International, may be used. These bearings offer a smooth low friction bearing surface and are self-lubricating. The permanent magnet 117 or other suitable magnetic field generating component may be placed above the piston rod bearing 132, as shown in FIG. 2A, or may be placed between the piston rod bearing 132 and the inner seal 124, as shown in FIGS. 2B and 3.

A fluid chamber 134 is formed between the filtering media 120, the inner piston rod seal 124, the piston rod bearing 132, and the piston rod 114. The fluid chamber 134 is in communication with the reservoir 108 containing the magneto-rheological fluid. Preferably in operation, magneto-rheological fluid enters the inner annular recess 118 through ports 136 in the base of the piston rod guide 106 and flows through the filtering media 120 into the filtered fluid chamber 134. That is, the filtering media 120 is disposed in a communication path between the reservoir 108 and the fluid chamber 134. The filtering media 120 strains or filters out the magnetizable particles in the magneto-rheological fluid and allows the filtered carrier fluid to enter the fluid chamber 134. In a preferred embodiment, the permanent magnet 117 is mounted at an end of the filtering media 120 to collect magnetic particle dust left unfiltered by the filtering media 120, preferably providing magnetic filtering of magnetic particles thereby ensuring that the outer piston rod seal 128 is exposed to only filtered non-particulate clear carrier fluid. Protecting the outer seal 128 from particulates prolongs the useful life of the seal. In a preferred embodiment, the filtering media 120 inhibits the migration of magnetic particles from the inner piston rod seal 124 to the outer seal 128, with the outer seal filtered non-particulate clear carrier fluid having less than one percent of the magnetizable (iron) particle fraction of the magneto-rheological fluid contacting the inner piston rod seal 124. The filtering media 120 preferably provides a static charge pressure between the two seals 124, 128, and preferably provides that the inner seal 124 is only exposed to fluid dynamic pressure and that the outer seal 128 is only exposed to static pressure. By exposing the outer seal 128 to only static fluid pressure, air ingestion into the reservoir 108 is prevented.

The annular body 110 of the piston rod guide 106 further includes an outer annular recess 138. A diaphragm or bladder 140 is mounted in the outer annular recess 138 and abuts an inner wall 142 of the damper body 102 of the damper body 102. The diaphragm 140 defines an air-volume which functions as an accumulator 144. In use, the accumulator 144 is charged with an inert gas such as nitrogen. Although not shown, a port may be provided in the inner wall 142 of the damper body 102 or in the annular body 110 through which gas can be supplied into the accumulator 144. The diaphragm 140 is exposed to the magneto-rheological fluid in the reservoir 108 through an annular body 110 of the piston rod guide 106 and the inner wall 142 of the damper body 102. The accumulator 144 serves to minimize pressure transients in the magneto-rheological fluid in the reservoir 108, thereby minimizing the risk of cavitation or negative pressure. Thus, the accumulator 144 minimizes pressure transients while the porous filter media 120 filters out pressure transients from the outer piston rod seal 128. The combined effect is low charge pressures similar to those in passage cars, i.e., on the order of 200 to 300 psig, without risk of air ingestion and with minimal risk of cavitation. Preferably the piston rod guide includes and houses an accumulator, preferably a gas charged accumulator.

Figure 3:
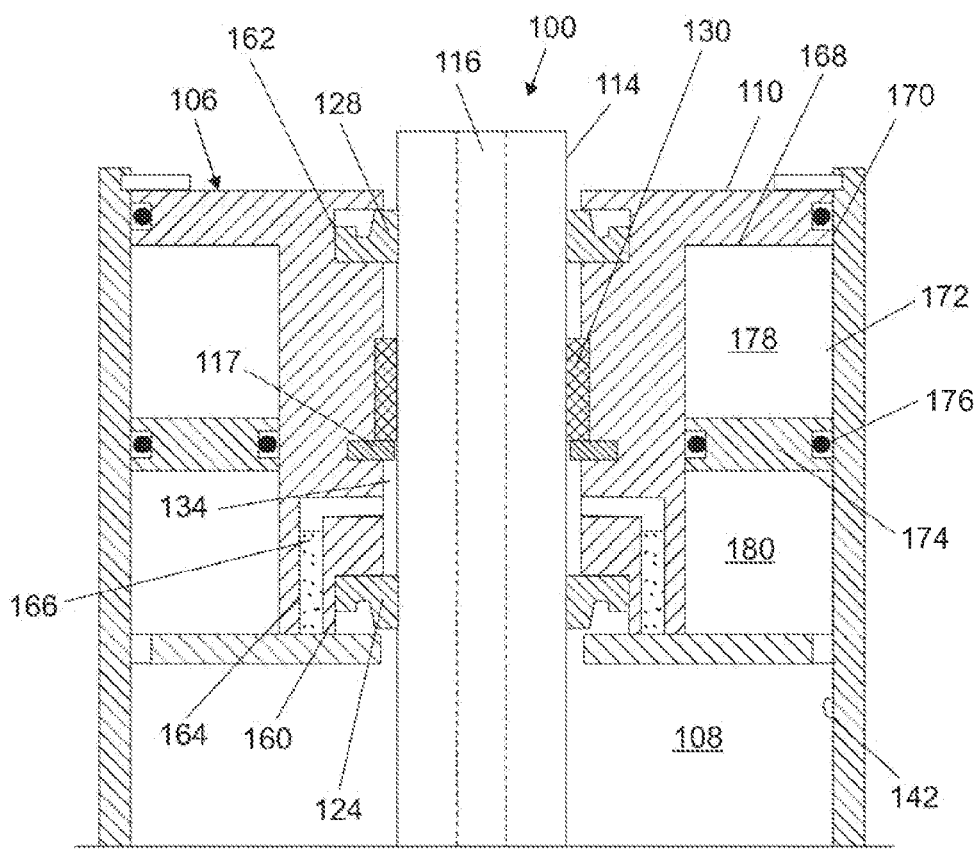

FIG. 3 shows an alternative example of the magneto-rheological fluid damper 100. In this example, the annular body 110 of the piston rod guide 106 includes inner annular recesses 160, 162, which hold inner piston rod seal 124 and outer piston rod seal 128, respectively. This embodiment includes the piston rod guide with a gas charged accumulator. A fluid conduit or passage 164 extends from the base of the annular body 110 and terminates in an inner surface 166 of the annular body 110 adjacent to the piston rod 114. A filtering media 166, having properties described for the filtering media 120 (FIGS. 2A and 2B) above, is disposed in the passage 164 to filter magnetizable particles from fluid entering the fluid chamber 134 defined between the piston rod 114, the inner surface 166 of the annular body 110, and the seals 124, 128. In this example, the annular body 110 includes an outer annular recess 168 which is open at the outer surface 170 of the annular body 110. The outer surface 170 of the annular body 110 abuts the inner wall 142 of the damper body 102, thereby defining a chamber 172, which serves as an accumulator. A piston 174 is disposed in the chamber 172 and can slide within the chamber 172 in response to pressure differential across it. The piston 174 includes sealing members 176, which engage an inner wall 178 of the annular body 110 and the inner wall 142 of the damper body 102, thereby partitioning the chamber 172 into a gas chamber 178 and a magneto-rheological fluid chamber 180. The gas chamber 178 may be filled with an inert gas such as nitrogen. Although not shown, a port may be provided in the damper body 102 or annular body 110 through which gas can be supplied to the gas chamber 178. The magneto-rheological fluid chamber 180 is in communication with the reservoir 108 through a gap between the base of the annular body 110 and the inner wall 142 of the damper body 102 or through ports in the base of the annular body 110. The accumulator provided by the chamber 172 and piston 174 serves the same purpose as described for the accumulator 144 (FIGS. 2A and 2B) above. Preferably the piston rod guides include and house a gas charged accumulator, preferably between the piston rod 114 and the damper body 102, and preferably proximate the seal 124.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

We claim:

1. A magneto-rheological damper, comprising:
    a damper body having a reservoir for a magneto-rheological fluid;
    a piston rod;
    a piston rod guide disposed within the damper body, the piston rod guide having a passage therein for receiving the piston rod;
    at least a first piston rod seal and at least a second piston rod seal arranged to seal between the piston rod guide and the piston rod;
    a fluid chamber defined between the piston rod guide and the piston rod, the fluid chamber being in communication with the reservoir;
    a piston rod guide filter arranged in a communication path between the fluid chamber and the reservoir to filter particulates out of the magneto-rheological fluid entering the fluid chamber, wherein the piston rod guide filter includes a magnetic field generator; and
    an accumulator arranged between the piston rod guide and the damper body.

2. The magneto-rheological damper of claim 1, further comprising a piston rod bearing assembly coupled to the piston rod guide and arranged to engage and support reciprocal motion of the piston rod.

3. The magneto-rheological damper of claim 1, wherein the accumulator comprises a diaphragm.

4. The magneto-rheological damper of claim 1, wherein the accumulator comprises a gas charged piston.

5. The magneto-rheological damper of claim 1, wherein the magnetic field generator is a permanent magnet.

6. The magneto-rheological damper of claim 1, wherein the magnetic field generator is an electromagnetic coil.

7. The magneto-rheological damper of claim 1, wherein the piston rod guide filter includes a fluid conduit in communication with the reservoir.

8. The magneto-rheological damper of claim 7, wherein the filtering media is disposed in the fluid conduit.

9. The magneto-rheological damper of claim 1, wherein the fluid chamber is defined between the at least first and second piston rod seals.

10. A magneto-rheological damper, comprising:
a damper body having a reservoir for a magneto-rheological fluid;
a piston rod;
a piston rod guide disposed within the damper body, the piston rod guide having a passage therein for receiving the piston rod;
a piston rod bearing assembly coupled to the piston rod guide and arranged to engage and support reciprocal motion of the piston rod;
at least a first piston rod seal and at least a second piston rod seal arranged to seal between the piston rod guide and the piston rod;
a fluid chamber defined between the piston rod guide and the piston rod, the fluid chamber being in communication with the reservoir;
a piston rod guide filter defining a means for filtering fluid entering the fluid chamber, wherein the piston rod guide filter includes a magnetic field generator; and
an accumulator arranged between the piston rod guide and the damper body.

11. The magneto-rheological damper of claim 10, wherein the accumulator comprises a diaphragm.

12. The magneto-rheological damper of claim 10, wherein the accumulator comprises a gas charged piston.

13. The magneto-rheological damper of claim 10, wherein the magnetic field generator is a permanent magnet.

14. The magneto-rheological damper of claim 10, wherein the magnetic field generator is an electromagnetic coil.

15. The magneto-rheological damper of claim 10, wherein the piston rod guide filter includes a fluid conduit in communication with the reservoir.

16. The magneto-rheological damper of claim 15, wherein the filtering media is disposed in the fluid conduit.

17. A method of controlling motion, said method including:
providing a magneto-rheological fluid;
providing a damper body having a reservoir for containing the magneto-rheological fluid;
providing a piston rod;
providing a piston rod guide disposed within the damper body, the piston rod guide having a passage therein for receiving the piston rod;
providing a piston rod assembly coupled to the piston rod guide and arranged to engage and support reciprocal motion of the piston rod;
providing at least a first piston rod seal and at least a second piston rod seal arranged to seal between the piston rod guide and the piston rod;
providing a fluid chamber defined between the piston rod guide and the piston rod;
providing a piston rod guide filter arranged in a communication path between the fluid chamber and the reservoir to filter particulates out of fluid entering the fluid chamber, wherein the piston rod guide filter includes a magnetic field generator; and
providing an accumulator arranged between the piston rod guide and the damper body.

18. A magneto-rheological damper, comprising:
a damper body;
a piston rod guide disposed within the damper body, the piston rod guide having a passage therein for receiving a piston rod;
a piston rod bearing assembly disposed in the piston rod guide to engage with and support reciprocal motion of the piston rod;
at least a first piston rod seal and at least a second piston rod seal arranged to seal between the piston rod guide and the piston rod;
a lubrication chamber defined between the piston rod guide and the piston rod;
a piston rod guide filter, said piston rod guide filter filtering fluid entering the lubrication chamber, wherein said piston rod guide filter includes a magnetic field generator; and
a piston rod guide gas charged accumulator, said piston rod guide gas charged accumulator arranged between the piston rod and the damper body.

19. The magneto-rheological damper of claim 18, wherein the accumulator comprises a diaphragm.

20. The magneto-rheological damper of claim 18, wherein the accumulator comprises an accumulator piston.

21. A land vehicle suspension system fluid damper, comprising:
a damper body;
a piston rod guide disposed within the damper body, the piston rod guide having a passage therein for receiving a piston rod;
a piston rod bearing assembly disposed in the piston rod guide to engage with and support reciprocal motion of the piston rod;
at least a first piston rod seal and at least a second piston rod seal arranged to seal between the piston rod guide and the piston rod;
a lubrication chamber defined between the piston rod guide and the piston rod;
a piston rod guide gas charged accumulator, said piston rod guide gas charged accumulator arranged between the piston rod and the damper body; and
a piston rod guide filter, said piston rod guide filter filtering a plurality of particles entering the lubrication chamber wherein said piston rod guide filter includes a magnetic field generator.

22. The damper of claim 21, wherein the damper includes a magneto-rheological fluid reservoir with a magneto-rheological damper fluid with a plurality of magnetic fluid particles and a filter, said filter filtering said magnetic fluid particles entering the lubrication chamber.

* * * * *